United States Patent [19]

Ormesher

[11] Patent Number: 4,486,228
[45] Date of Patent: Dec. 4, 1984

[54] METAL SCRAP RECLAMATION SYSTEM
[75] Inventor: Robert J. Ormesher, Leechberg, Pa.
[73] Assignee: Aluminum Company of America, Pittsburgh, Pa.
[21] Appl. No.: 573,115
[22] Filed: Jan. 23, 1984

Related U.S. Application Data

[63] Continuation of Ser. No. 475,310, Mar. 14, 1983, abandoned.

[51] Int. Cl.$^3$ .............................................. C22B 21/00
[52] U.S. Cl. .................................. 75/65 R; 75/68 R; 266/235; 266/901
[58] Field of Search ............... 266/235, 901; 75/65 R, 75/68 R

[56]  References Cited
U.S. PATENT DOCUMENTS

| | | | |
|---|---|---|---|
| 3,873,305 | 3/1975 | Claxton et al. | 75/68 R |
| 3,997,336 | 12/1976 | van Linden et al. | 75/68 R |
| 4,088,502 | 5/1978 | LaBar | 106/64 |
| 4,128,415 | 12/1978 | Van Linden et al. | 75/65 R |
| 4,322,245 | 3/1982 | Claxton | 75/68 R |

Primary Examiner—M. J. Andrews
Attorney, Agent, or Firm—Andrew Alexander

[57] ABSTRACT

An improved method of melting metal scrap in a molten melting media is disclosed. The method comprises the steps of providing a body of molten melting media in a housing having an upper portion and a lower portion, the lower portion having a generally cylindrical wall section. A supply of metal scrap is added to the housing and a supply of molten melting media is introduced to the upper portion of the housing. Melting of the metal scrap is initiated by ingesting it and molten melting media downwardly in the housing by action of an impeller positioned in the lower portion, the impeller having a flat ring member having an opening in the center thereof and having blades extending from said ring member to a substantially circular disc member. The scrap and melting media enters the opening in the ring member in an axial direction and is propelled therefrom in a radial direction by use of the blades. The impeller is positioned in the cylindrical wall section such that at least the ring member cooperates therewith to move the scrap and melting media from the upper portion through said impeller while substantially avoiding recirculation of the molten melting media within the housing to the upper portion.

8 Claims, 6 Drawing Figures

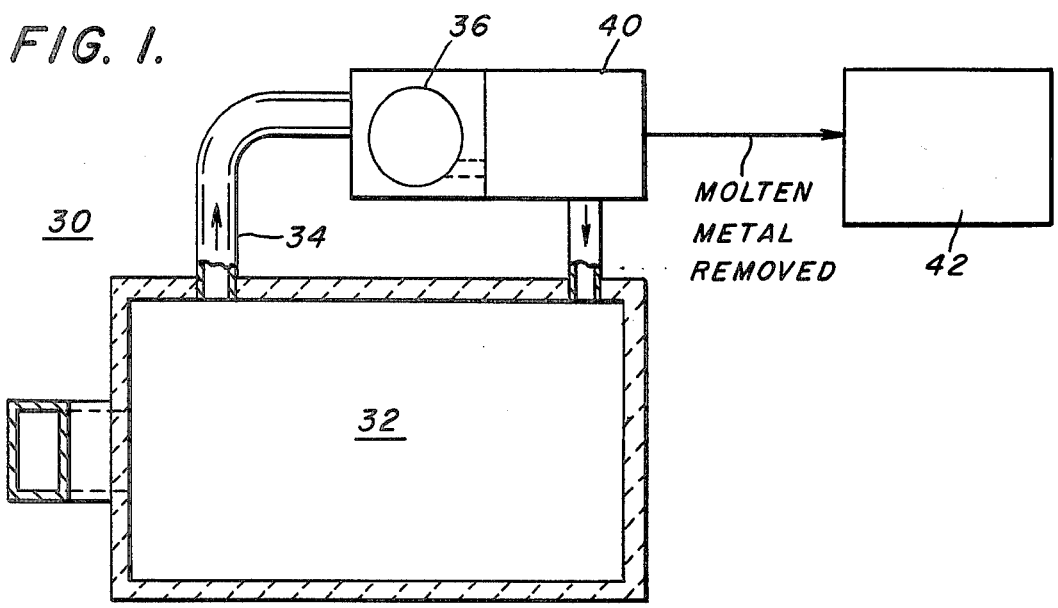
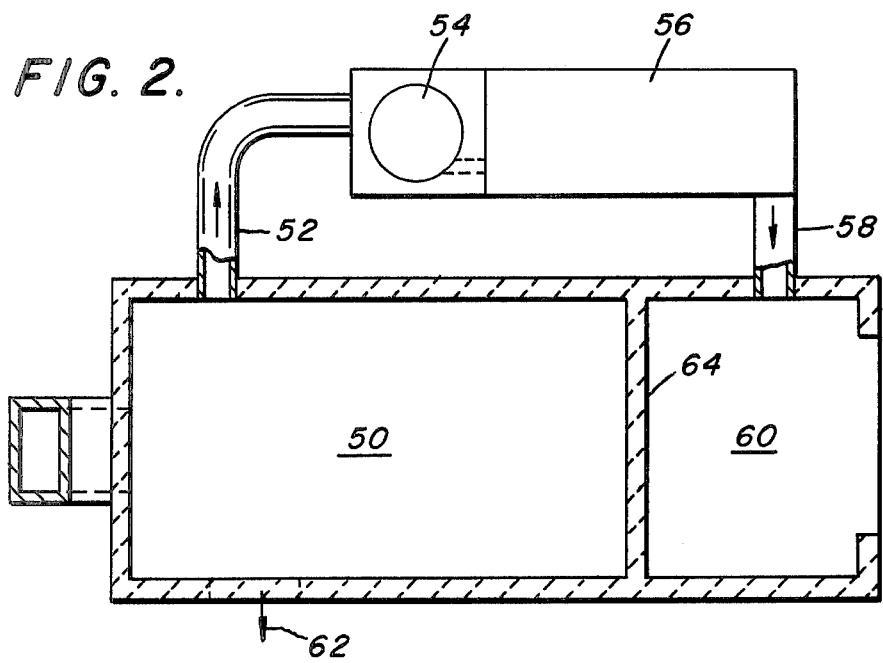
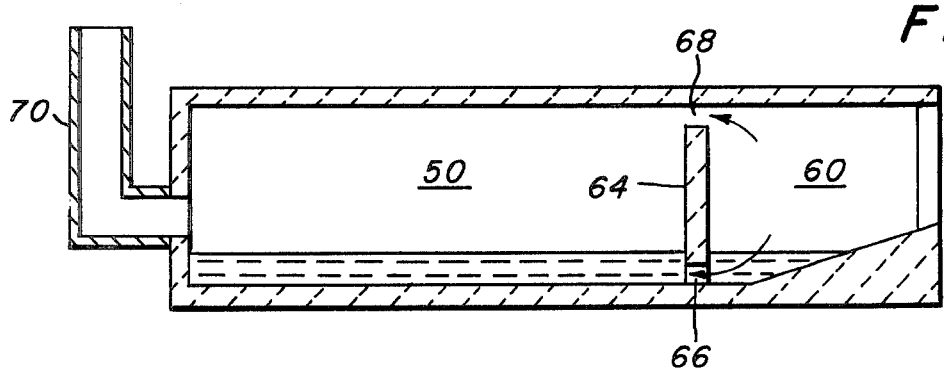

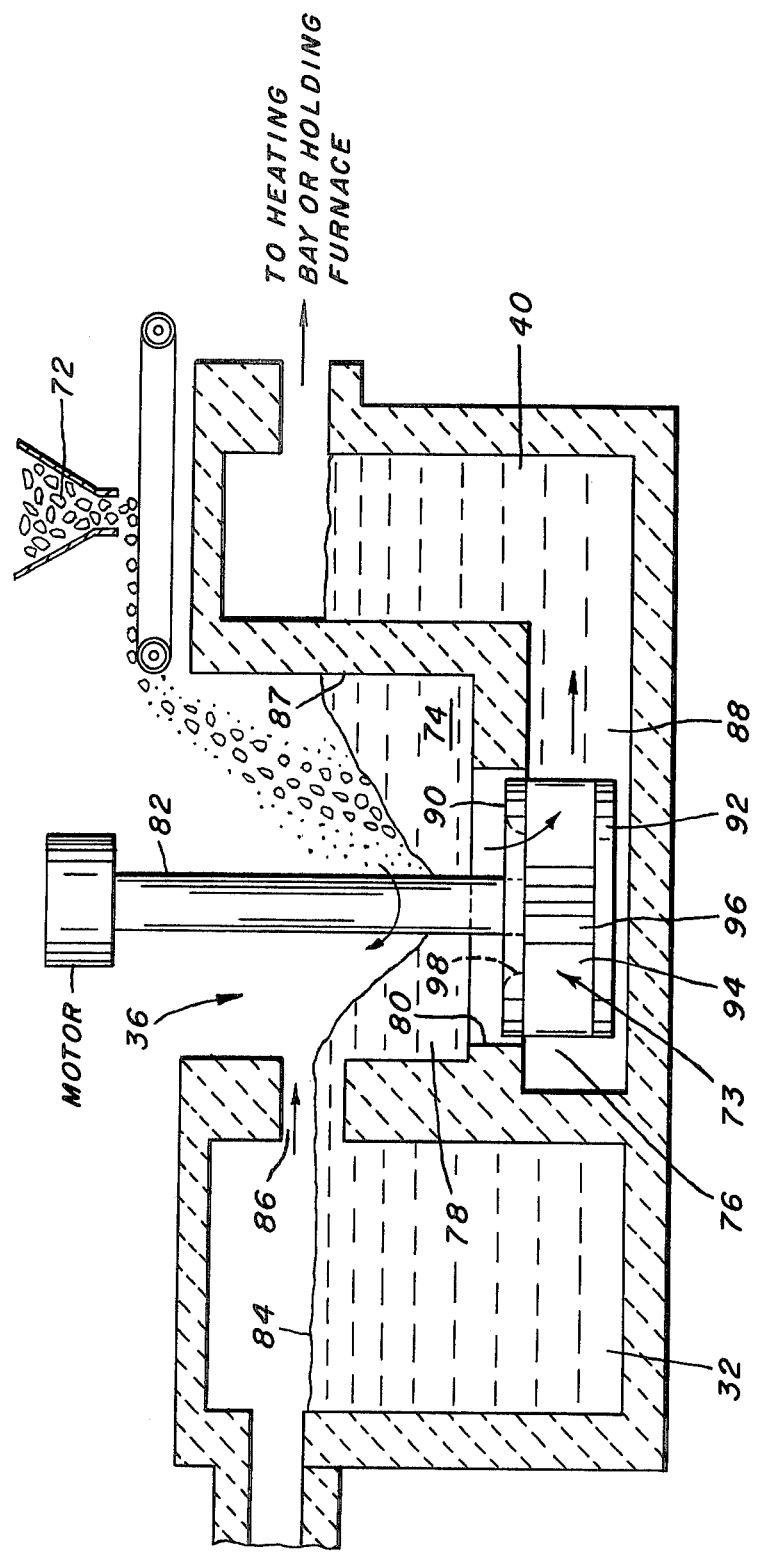

METAL SCRAP RECLAMATION SYSTEM

This application is a continuation of application Ser. No. 475,310 filed Nov. 14, 1983 abandoned.

BACKGROUND OF THE INVENTION

This invention relates to an improved scrap reclamation system and in particular to a method and apparatus for quickly and efficiently melting metal scrap in a recirculating melting system.

Increased effort is being placed on finding cheaper methods to recycle metal scrap, particularly in the light metals field. This effort is being expended because of the national and international concern over depletion of raw material sources for these metals.

Recycling systems for metal scrap are normally required to be at least competitive with established manufacturing systems for producing such metal. To be competitive, such recycling systems must be efficient which can often require that they be designed to reclaim certain or specific kinds of metal scrap. With respect to the kinds of metal scrap encountered in the light metals field, particularly aluminum, it should be observed that it can range from scrap generated very early in the manufacturing process to that resulting from used products, e.g. metal containers. Scrap generated early in the manufacturing of aluminum, for example, is scalping chips. These chips result from preparing the surface of an aluminum ingot for rolling or cladding or some such purpose when often large irregularities are removed. Chips removed at this time can constitute as much as 6% of the total metal in the ingot and, therefore, obviously can amount to a considerable amount of metal which can be recycled. Scrap typical of used metal containers which can be beneficial to recycle is metal beverage cans and the like. Recycling such cans serves to conserve resources and also to provide a cleaner environment.

These two types of scrap are often considered to present different problems from the standpoint of reclamation. For example, container or can scrap normally comprises bits and pieces of metal which can range in size from relatively small particles to crushed cans. Often, the cans can have holes pierced in them for purposes of delacquering using solvents. The pierced holes, while aiding the flow of solvent through the mass of cans, result in jagged edges which, together with the generally non-uniform shapes and sizes of crushed cans, make this scrap relatively non-flowable. Furthermore, such scrap tends to be rather buoyant with respect to the melting media, requiring special equipment to forcibly submerge it. A particular type of equipment for handling this type of scrap is disclosed in U.S. Pat. No. 3,873,305 where a rotating wedge forcibly submerges this type of scrap into the melting media. In the system described in this patent, additional equipment is required to recirculate the molten melting media.

U.S. Pat. No. 4,128,415 illustrates another system for reclaiming scrap wherein the melting media is drawn up into a bay where a metal scrap is melted. Further, U.S. Pat. No. 3,997,336 discloses a system where melting media and metal scrap are introduced into a bay and the scrap is forcibly submerged using an axial flow impeller.

With respect to the scalping chips, or scrap which may be characterized as flowable, for example, such as filings and cuttings or even large pieces, these can present difficulty in submerging as does the above-mentioned container scrap. Nevertheless, it is imperative that such flowable scrap be melted and reclaimed in the most efficient manner in order to provide an incentive to operate a remelting system as a source of metal, as compared to the established manufacturing system for producing such metal.

With highly oxidizable metals, such as aluminum, out of which the aforementioned containers and beverage cans are often made, it is important to provide a remelting system which provides maximum heat transfer for efficient melting. Also, it is important that the metal scrap be submerged with minimum turbulence at the melting media surface in order to minimize oxidation of the molten metal. Oxidation leads to skim formation, a problem inherent in most systems reclaiming highly oxidizable metals such as aluminum.

The skim referred to includes the metal oxide, e.g. $Al_2O_3$, and molten metal which becomes entrained in such oxide. Skim is undesirable and, therefore, should be minimized not only because of the molten metal lost to it, but also because it can cause problems by acting as an insulator in the heating bay. That is, when combustion units discharging their heat on the surface of the molten media in the heating bay are used, skim floating on the surface thereof makes it difficult to heat the molten media. Also, such floating skim by rejecting heat can seriously shorten the useful life of the equipment by causing it to overheat.

The present invention provides a highly efficient method of recirculating molten melting media and for reclaiming metal scrap in a recirculating melting system. The method is suitable for reclaiming either flowable or non-flowable scrap of the type referred to above.

SUMMARY OF THE INVENTION

An object of the present invention is to provide a recirculating system for melting metal scrap.

Another object of the invention is to provide a melting system for aluminum scrap.

Yet another object of the invention is to provide a melting system for metal scrap wherein the metal scrap is ingested through an impeller having axial flow thereinto and radial flow therefrom.

And yet another object of the present invention is to provide means for recirculating molten metal or molten melting media in a system suitable for melting metal scrap.

These and other objects will become apparent from a reading of the disclosure and claims and an inspection of the claims appended hereto.

An improved method of melting metal scrap in a molten melting media comprises providing a body of molten melting media in a housing having an upper portion and a lower portion, the lower portion being suited to cooperate with an impeller to pump molten melting media through the housing. A supply of metal scrap may be added to the upper portion of the housing. A supply of molten melting media is introduced to the upper portion of the housing. Melting of the metal scrap can be initiated or accomplished by ingesting it and molten melting media downwardly in said housing by action of an impeller positioned in the lower portion, the impeller having a flat ring member having an opening in the center thereof and having blades extending from the ring member to a substantially circular disc member. The melting media enters the opening in the ring member in an axial direction and is propelled therefrom in a radial direction by use of said blades. The impeller is positioned in the lower portion such that at least said ring member cooperates with the cylindrical wall section or other wall section in the housing to move melting media from the upper portion through said impeller while substantially avoiding recirculation of the molten melting media within the housing to the upper portion.

BRIEF DESCRIPTION OF THE DRAWINGS

FIG. 1 is a plan view showing a general schematic of a circulatory system in accordance with the present invention.

FIG. 2 is a plan view of a hot chamber and cold chamber in the recirculating melting system.

FIG. 3 is an elevational view in cross-section illustrating a pumping and scrap charging bay in accordance with the invention.

FIG. 4 is an elevational view in cross section through the pumping bay showing molten entrance and exit channels.

DETAILED DESCRIPTION OF THE PREFERRED EMBODIMENTS

Figure 5:
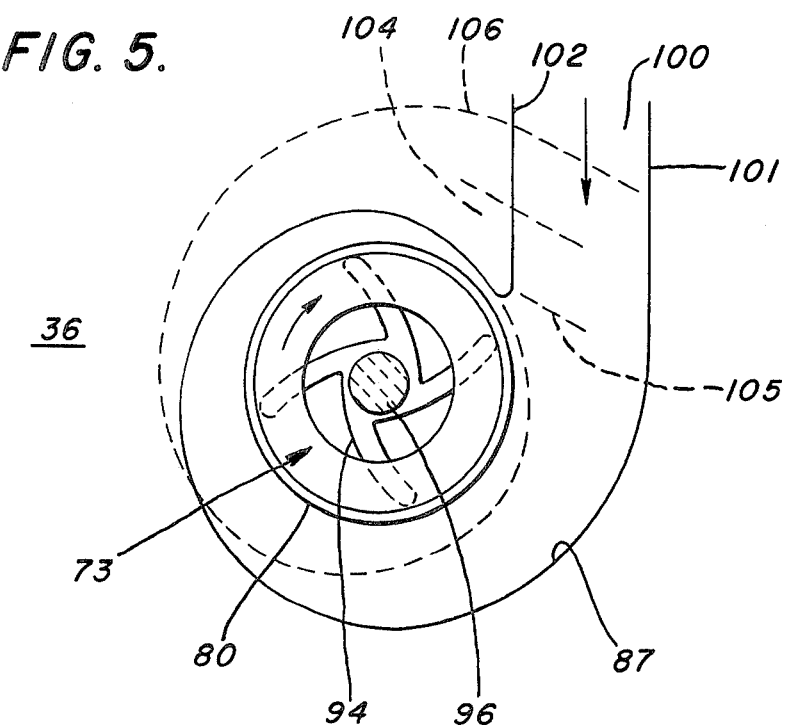
FIG. 5 is a top view of a pumping bay in accordance with the invention.

Referring now more specifically to FIG. 1, there is shown a schematic of a recirculating scrap melting system 30 in accordance with the present invention. In the recirculating melting system, melting media is circulated from heating bay or hot chamber 32 via conduit 34 to pumping and scrap charging bay 36. In bay 36, molten melting media, e.g. molten metal or molten aluminum, is drawn thereinto and scrap can be ingested thereinto by action of a pump impeller located in the bay. The molten melting media and ingested scrap are discharged or propelled from the bay into a skim bay 40, for example, for treatment or removal of skim or dross before being discharged from the system or passed into a holding furnace 42. It will be appreciated that molten metal can be removed from the system at a rate commensurate with the rate at which scrap is added.

The melting media, such as molten aluminum, can be heated by use of burners such as combustion units located in hot bay 32 or electrical heaters such as induction or resistance heaters immersed in the molten metal.

The melting media can be molten metal of similar composition to the metal charge or it may be a molten salt. If a molten salt is used, a salt-metal separation would normally be necessary to facilitate the removal of the melted metal. When molten aluminum is the melting media, a typical temperature leaving the heating bay 32 can be about 1400° F. although this temperature can range from 1325° to 1475° F., but with a higher temperature there is a greater tendency to form skim. A typical temperature re-entering heating bay 32 can be about 1250° to 1300° F. or even slightly lower without fear of solidification. This provides about a 100° F. temperature drop across the melting bay to provide heat to melt the charge. However, it should be noted that this temperature drop depends somewhat on charge rate and circulation rates. For example, the charge rates and circulation rates can be such that the temperature drop would only be 20° F.

Referring now to FIG. 2, there is shown another schematic of a recirculating system in accordance with the present invention. In this embodiment, melting media is circulated from hot chamber 50 via line 52 by action of an impeller in pump bay 54. Melting media can be discharged into a skim removal bay 56 and there via line 58 to a cold chamber 60 where scrap to be melted can be charged. Molten metal can be removed at 62 at a rate commensurate with the rate of scrap charging, if desired. Cold chamber 60 can be separated from hot chamber 50 by a wall 64 (see FIG. 3). The wall can have an opening 66 therein to pass molten metal from the cold bay to the hot bay. If the scrap is of the type which has coatings such as oil thereon, the fumes resulting therefrom can pass or be removed through opening 68 to the hot bay from which they can be removed from the system through channel 70 for treating. Hot chamber may be heated as noted above.

Referring now to FIG. 4, there is shown an elevational cross-sectional view of bay 36 (FIG. 1) which permits charging of metal scrap 72 thereinto which is ingested into molten melting media 74. That is, impeller 73 serves to circulate the molten melting media from the hot bay through the pumping and scrap charging bay to a skim removal bay and hence to the hot bay or a holding furnace. Impeller 73 has a configuration which requires the molten metal and scrap to be melted to be ingested downwardly in an axial direction into the impeller and expelled or propelled therefrom radially. Having the melting media and charge change direction in the impeller can result in greater melting efficiency. Thus, in FIG. 4, it will be seen that molten melting media is drawn from bay 32 through bay 36 and propelled through opening 88 into skim bay 40.

In order that the molten melting media be circulated efficiently, it is important that impeller 73 be positioned precisely in lower portion 76 of bay 36. That is, in order that impeller 73 draws the molten melting media downwardly in an axial direction and moves it into skim bay 40, the melting media, after having passed through impeller 73, cannot be permitted to recirculate into upper portion 78 of the bay. It will be understood that to permit substantial amounts of melting media to return from lower portion 76 to the upper portion 78 results in the pumping or recirculating action being adversely affected. By a "substantial amount" is meant an amount greater than may unavoidably escape through or around the fitting between the impeller and the wall section 80 in lower portion 76. It will be understood that is the impeller is merely placed in an open bay, it will function as a mixer rather than circulating mechanism.

Lower housing at sidewall 80 can be substantially circular to fit and cooperate with impeller 73 to pump molten melting media. However, sidewall 80 may be shaped to provide an opening other than circular which can be shaped to cooperate with impeller 73 positioned therein to minimize the amount of molten metal escaping to the upper portion.

In FIG. 4, it will be seen that impeller 73 is carried on a shaft 82. Further, it will be observed that impeller 73 is fitted into lower portion 76 with a tolerance being provided at least between lower housing 76 at side wall 80 and the top of the impeller to prevent or minimize the amount of molten melting media that may escape therebetween. Thus, in operation, impeller 73, as well as recirculating melting media, continuously depletes and replenishes the melting media in bay 36, the depletion rate being commensurate with the rate at which melting media and scrap are added to the bay.

Figure 6:
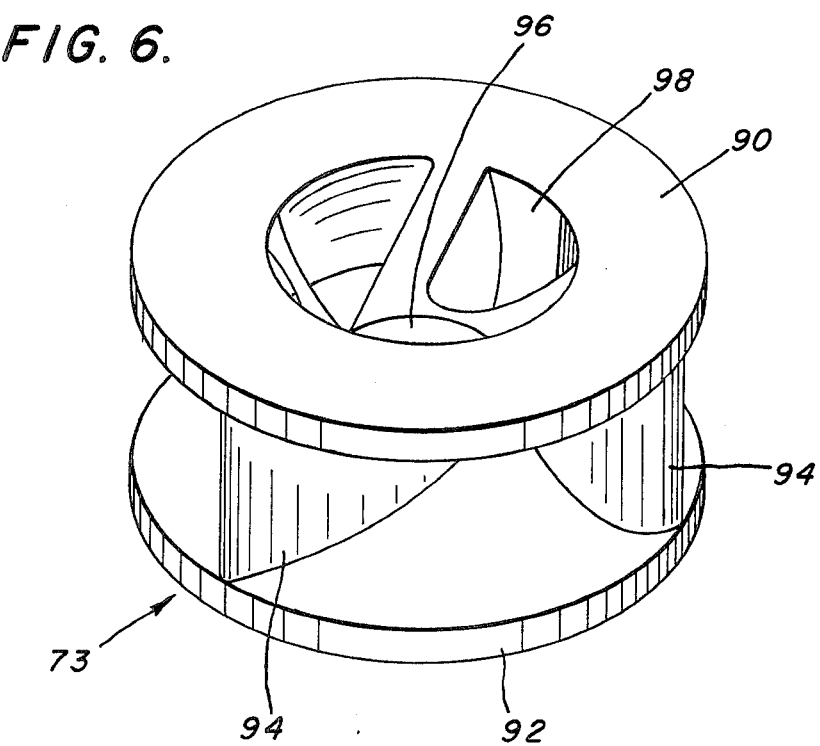
FIG. 6 is a pictorial view of the impeller in FIG. 4.

An impeller and its position in lower portion 76, which has been found to be suitable for this operation, is shown in FIGS. 4, 5 and 6. Further, in FIG. 4, it will be observed that melting media can be introduced to bay 36 through an opening 86, which for purposes of the present invention may be placed below level 84 of the melting media but above impeller 73. In addition, for purposes of expelling material radially from impeller 73, a channel or opening 88 must be provided in lower portion 76, as shown in FIG. 4, for example.

From FIGS. 4 and 6, it will be noted that impeller 73 has a top, flat circular ring member 90 and a flat circular disc member 92. Between ring member 90 and disc member 92, blades 94 extend in a generally radial direction from a central hub 96. Hub 96 provides means by which the impeller may be joined or carried on shaft 82. With the shaft joined to impeller 73, ring 90 provides or defines openings 98 with blades 94 through which the molten metal or melting media is drawn and from which molten material is expelled radially into opening 88.

It will be understood that means may be added to the top ring 90 to permit it to cooperate with sidewall 80 to restrict the amount of melting media which may recirculate to the upper portion of the housing. That is, it will be understood that when ring member 90, for example, overlaps sidewall 80, the sidewall overlap may be circular or some other shape which does not permit recirculation of the molten material in the housing.

In a preferred aspect of the invention, wall 87 of bay 36 may have a configuration, as shown in FIG. 5, to facilitate flow of molten melting media through impeller 73. That is, bay 36 is arranged to provide a spiral shaped flow pattern to molten metal entering the upper portion and leaving the lower portion. Thus, in FIG. 5 molten metal enters the upper portion along channel 100 which has sides 101 and 102. It will be noted that impeller 73 is placed in the lower portion 76 and is placed within circular wall section 80. Wall 101 continues in a circular pattern which may be described as one which has a decreasing radius until it meets side 102. This configuration is useful in its effectiveness in directing molten melting media through the impeller. When the melting media passes through the impeller, it is preferred that a channel or conduit be used that opens into an exit 104 having sides 105 and 106 with side 106 which is generally circular and may be described as a circle having an increasing diameter until it becomes more or less parallel to side 105.

In operation, the present system is capable of pumping as much as one million pounds per hour of molten metal or melting media at an rpm of 100 to 140. This rate of pumping may be achieved with an impeller having about a 20 inch diameter and having blades approximately six inches in height. The band of ring member 90 may be about five inches in width.

In the present system, materials of construction of bay 36 can be any material suitably resistant to erosion or corrosion by molten aluminum or molten salts. Such materials include silicon carbide or any other refractory normally used with molten aluminum. With respect to the impeller, since dimensions can be relatively imprecise when compared to pumps normally used to pump molten metals, e.g. no seals, etc., the impeller and shaft can be cast. Alternatively, if the fabricating material is graphite, the impeller assembly can be machined. Preferably, the impeller 73 is fabricated from a refractory material comprising a zinc borosilicate frit. A particularly suitable zinc borosilicate frit is described in U.S. Pat. No. 4,088,502, hereby incorporated by reference.

While the invention has been described in terms of preferred embodiments, the claims appended hereto are intended to encompass other embodiments which fall within the spirit of the invention.

What is claimed is:

1. An improved method of melting metal scrap in a molten melting media comprising the steps of:
    (a) providing a body of molten melting media in a housing having an upper portion and a lower portion;
    (b) adding a supply of metal scrap to said housing;
    (c) introducing a supply of molten melting media to the upper portion of the housing; and
    (d) initiating melting of the metal scrap by ingesting it and molten melting media downwardly in said housing by action of an impeller positioned in the lower portion, the impeller having a top member having a circular opening in the center thereof and having a circular base member spaced below said top member and having blades extending from said top member to said base member, the scrap and melting media entering the opening in the top member in an axial direction and being propelled therefrom in a radial direction by use of said blades, the impeller positioned in the lower portion such that said top member cooperates with the lower portion to move the scrap and melting media from the upper portion through said impeller while substantially avoiding recirculation of the molten melting media within said housing to the upper portion.

2. The method in accordance with claim 1 wherein the metal scrap is aluminum or alloys thereof.

3. The method in accordance with claim 1 wherein the melting media is selected from molten salts and molten metal.

4. The method in accordance with claim 1 wherein the melting media comprises molten aluminum.

5. The method in accordance with claim 1 wherein the lower portion has a generally cylindrical wall section.

6. An improved method of melting aluminum or aluminum alloy scrap in a molten aluminum comprising the steps of:
    (a) providing a body containing aluminum in a housing having an upper portion and a lower portion, the lower portion having a generally cylindrical wall section;
    (b) adding a supply of said scrap to said housing;
    (c) introducing a supply of said molten aluminum to the upper portion of the housing; and
    (d) initiating melting of the scrap by ingesting it and said molten aluminum downwardly in said housing by action of an impeller positioned in the lower portion, the impeller having a flat ring member having an opening in the center thereof and having blades extending from said ring member to a substantially circular disc member, the scrap and melting media entering the opening in the ring member in an axial direction and being propelled therefrom in a radial direction by use of said blades, the impeller positioned in a cylindrical wall section such that at least said ring member cooperates therewith to move the scrap and melting media from the upper portion through said impeller while substantially avoiding recirculation of the molten melting media within said housing to the upper portion.

7. In a recirculating system for melting metal scrap, having at least a heating bay and a pumping bay, an improved method of pumping molten melting media through the pumping bay comprising the steps of:
- (a) providing a body of molten melting media in said pumping bay housing having an upper portion and a lower portion, both portions having a generally cylindrical wall section;
- (b) flowing molten melting media into said upper portion in a direction which is substantially tangential with respect to said housing;
- (c) ingesting molten melting media downwardly in said housing by action of said impeller positioned in the lower portion, the impeller having a flat ring member having an opening in the center thereof and having blades extending from said ring member to a substantially circular disc member, the melting media entering the opening in the ring member in an axial direction and being propelled therefrom in a radial direction by use of said blades; and
- (d) flowing the melting media away from the lower portion after exiting said impeller such that a substantial spiral shaped flow pattern is established through the housing, the impeller positioned in the lower portion such that at least said ring member cooperates with the wall section thereof to move melting media from the upper portion through said impeller while substantially avoiding recirculation of the molten melting media within said housing to the upper portion.

8. In a recirculating system for melting metal scrap, having a heating bay and a scrap charging bay, an improved method of ingesting the metal scrap in the molten melting media comprising the steps of:
- (a) providing a body of molten melting media in a scrap charging bay having upper and lower portions;
- (b) adding a supply of metal scrap to said charging bay;
- (c) introducing a supply of molten melting media to the charging bay; and
- (d) initiating melting of the metal scrap by ingesting it and molten melting media downwardly in said charging bay by action of an impeller positioned in the lower portions, the impeller having a top member having a circular opening in the center thereof and having a flat circular base member spaced below said top member and having blades extending from said top member to said base member, the scrap and melting media entering the opening in the top member in an axial direction and being propelled therefrom in a radial direction by use of said blades, the impeller positioned in the lower portions such that said top member cooperates with the lower portions to move the scrap and melting media from the upper portions through said impeller while retarding recirculation of the molten melting media within said charging bay.

* * * * *